US012614148B2

(12) United States Patent (10) Patent No.: US 12,614,148 B2
Ganesan et al. (45) Date of Patent: Apr. 28, 2026

(54) SYSTEM AND METHOD FOR PROACTIVE MANAGEMENT OF COMPONENTS BASED ON PREDICTED COMPONENT FAILURES

(71) Applicant: Dell Products L.P., Round Rock, TX (US)

(72) Inventors: Vaideeswaran Ganesan, Bangalore (IN); Sakshi Arora, Gurugram (IN); Shrinidhi Katte, Bangalore (IN); Sakshi Garg, Agra (IN); Shubhangi Srivastava, Delhi (IN)

(73) Assignee: Dell Products L.P., Round Rock, TX (US)

( * ) Notice: Subject to any disclaimer, the term of this patent is extended or adjusted under 35 U.S.C. 154(b) by 363 days.

(21) Appl. No.: 17/871,613

(22) Filed: Jul. 22, 2022

(65) Prior Publication Data

US 2024/0029016 A1 Jan. 25, 2024

(51) Int. Cl.
*G06Q 10/00* (2026.01)
*E21B 41/00* (2006.01)
*E21B 47/00* (2012.01)
*G06F 11/20* (2006.01)
*G06Q 10/087* (2023.01)

(52) U.S. Cl.
CPC ....... *G06Q 10/087* (2013.01); *G06F 11/2028* (2013.01)

(58) Field of Classification Search
CPC .......................... G06Q 10/087; G06F 11/2028
See application file for complete search history.

(56) References Cited

U.S. PATENT DOCUMENTS

| | | | | |
|---|---|---|---|---|
| 8,781,882 | B1* | 7/2014 | Arboletti | G06Q 10/0639 |
| | | | | 705/7.41 |
| 10,229,383 | B2* | 3/2019 | Danelski | G06Q 10/087 |
| 10,817,839 | B1* | 10/2020 | Clem | G06Q 30/0635 |
| 2008/0222003 | A1* | 9/2008 | Adstedt | G06Q 30/0631 |
| | | | | 705/26.7 |
| 2016/0292606 | A1* | 10/2016 | Mukherjee | G06Q 10/087 |
| 2018/0247256 | A1* | 8/2018 | Takigawa | G06Q 10/087 |
| 2019/0172012 | A1* | 6/2019 | Roy | G06Q 10/0875 |
| 2020/0190959 | A1* | 6/2020 | Gooneratne | E21B 17/02 |
| 2020/0190963 | A1* | 6/2020 | Gooneratne | G01N 21/8851 |

* cited by examiner

*Primary Examiner* — Talia F Crawley
(74) *Attorney, Agent, or Firm* — WOMBLE BOND DICKINSON (US) LLP

(57) ABSTRACT

Methods and system for managing data processing system are disclosed. To manage the operation of the data processing system, hardware components may be replaced from time to time. To improve the likelihood of hardware components being available, procurement plans for proactive management of hardware component inventors for replacement may be used. The procurement plans may be based on various limits regarding when and how many hardware components may be purchased, predicted hardware component failures, and goals for hardware component acquisition that may reduce or manage cost associated with hardware component acquisition.

20 Claims, 5 Drawing Sheets

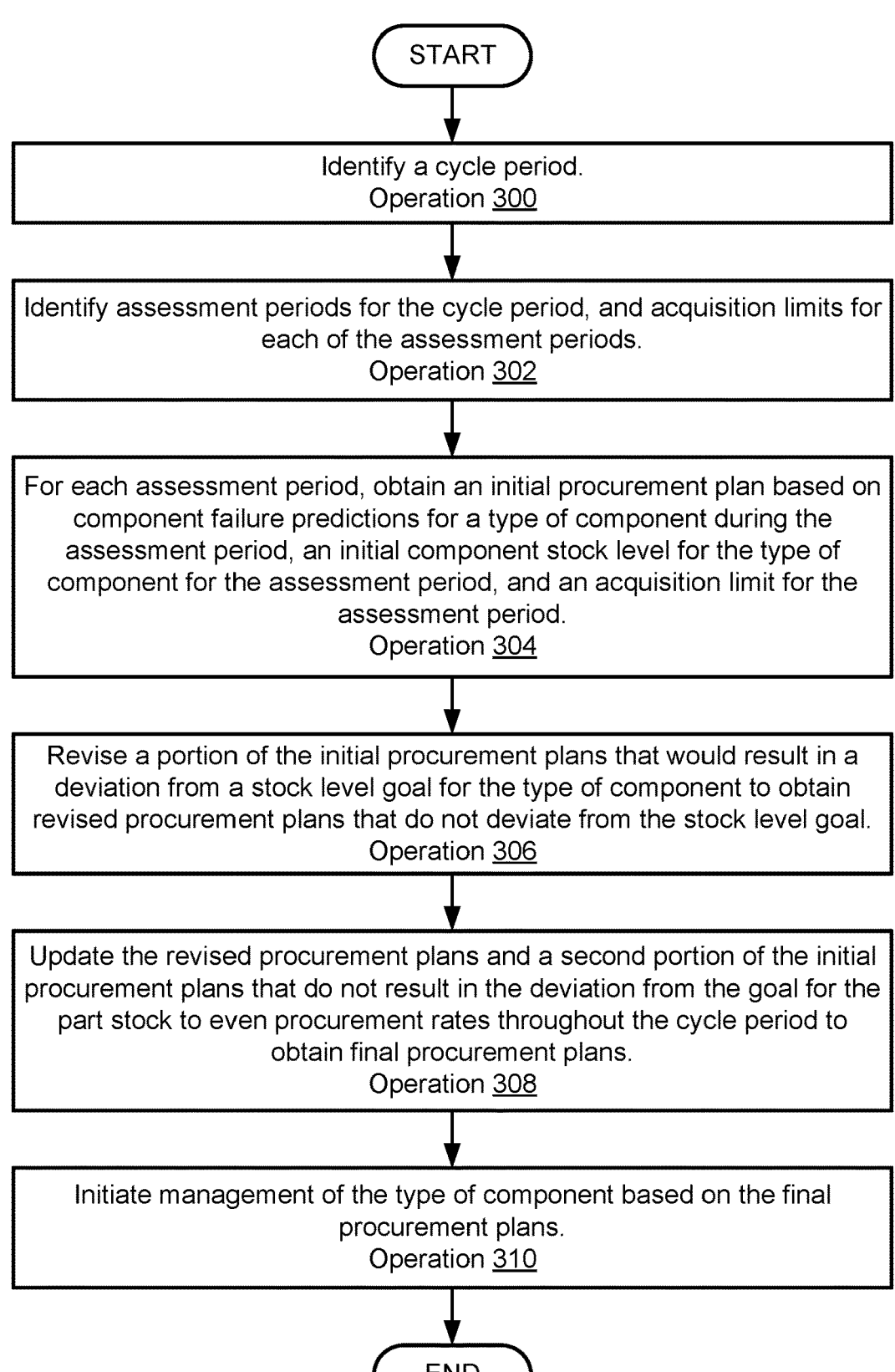

( START )

Identify a cycle period.
Operation 300

Identify assessment periods for the cycle period, and acquisition limits for
each of the assessment periods.
Operation 302

For each assessment period, obtain an initial procurement plan based on
component failure predictions for a type of component during the
assessment period, an initial component stock level for the type of
component for the assessment period, and an acquisition limit for the
assessment period.
Operation 304

Revise a portion of the initial procurement plans that would result in a
deviation from a stock level goal for the type of component to obtain
revised procurement plans that do not deviate from the stock level goal.
Operation 306

Update the revised procurement plans and a second portion of the initial
procurement plans that do not result in the deviation from the goal for the
part stock to even procurement rates throughout the cycle period to
obtain final procurement plans.
Operation 308

Initiate management of the type of component based on the final
procurement plans.
Operation 310

( END )

FIG. 3

SYSTEM AND METHOD FOR PROACTIVE MANAGEMENT OF COMPONENTS BASED ON PREDICTED COMPONENT FAILURES

FIELD

Embodiments disclosed herein relate generally to device management. More particularly, embodiments disclosed herein relate to systems and methods to manage the operation of devices through inventory management.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

FIG. 3 shows a flow diagram illustrating a method of managing hardware components in accordance with an embodiment.

DETAILED DESCRIPTION

Figure 1:
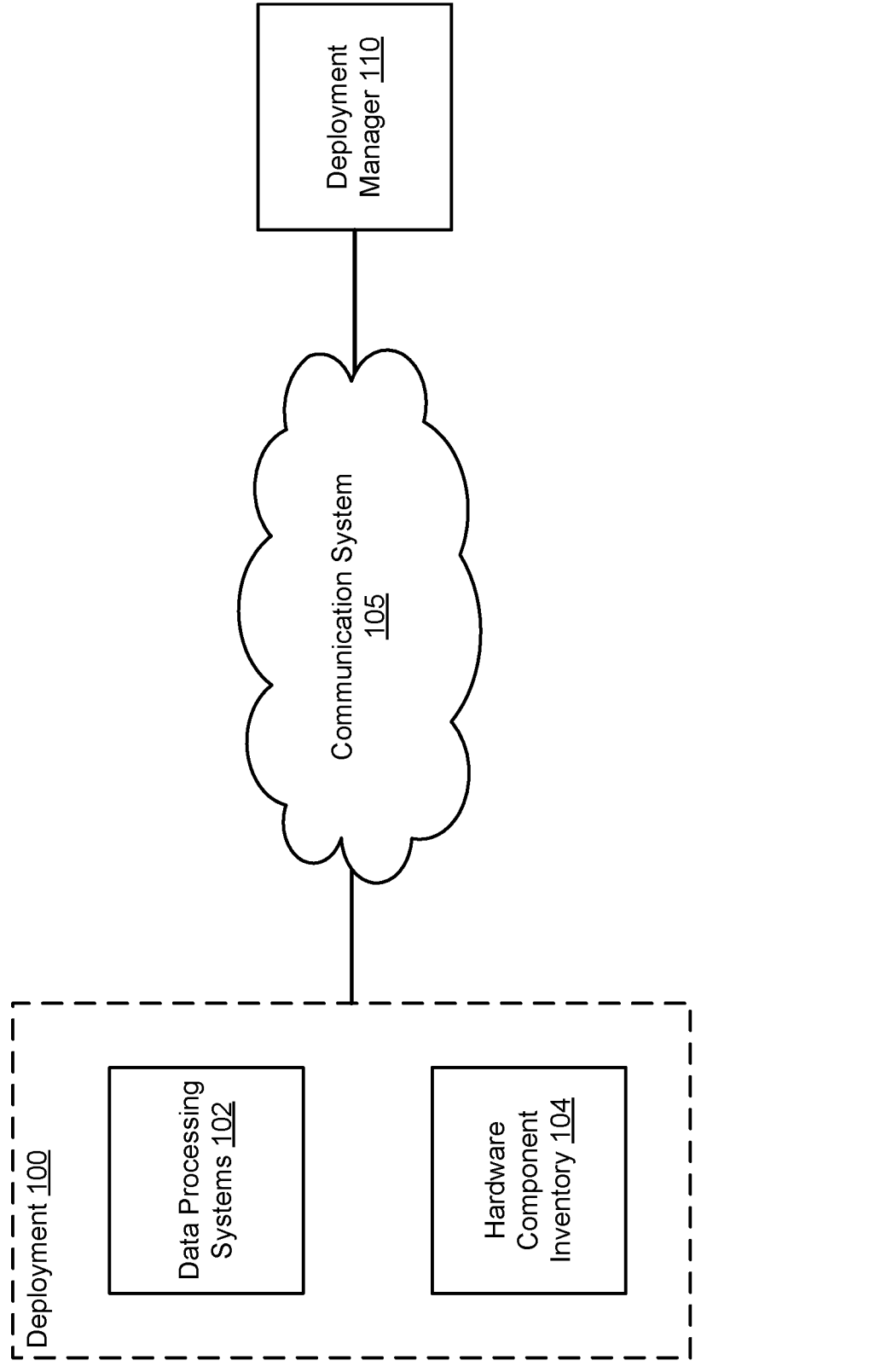
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing system. A data processing system may include one or more hardware and/or software components. The operation of the data processing system may depend on the operation of these components. For example, improper operation of any of these components may impair (e.g., reduce performance, reduce functionality, etc.) the operation of the data processing system.

To manage the operation of the data processing system, hardware components may be replaced from time to time. To improve the likelihood of hardware components being available, embodiments disclosed herein may provide procurement plans for proactive management of hardware component inventories. The procurement plans may be based on various limits regarding when and how many hardware components may be purchased, predicted hardware component failures, and goals for hardware component acquisition that may reduce or manage cost associated with hardware component acquisition.

By doing so, a system in accordance with embodiments disclosed herein may provide a higher uptime through improved availability of hardware components for replacement, as well as reduce cost for management through an efficient acquisition process that manage the realities of hardware component acquisition in a market environment.

In an embodiment, a computer-implemented method for managing data processing systems using component failure predictions is provided. The method may include identifying a cycle period for managing the data processing systems; identifying assessment periods for the cycle period, and acquisition limits for each of the assessment periods; for each of the assessment periods, obtaining an initial procurement plan based on: a portion of the component failure predictions associated with a type of a component for the assessment period, an initial component stock level for the type of the component for the assessment period, and an acquisition limit for the assessment period; identifying a first portion of the initial procurement plans that would result in a deviation from a stock level goal for the type of the component and a second portion of the initial procurement plans that would maintain compliance with the stock level goal for the type of the component; revising the first portion of the initial procurement plans to obtain revised procurement plans that would maintain compliance with the stock level goal for the type of the component; updating the revised procurement plans and the second portion of the initial procurement plans to even procurement rates throughout the cycle period to obtain final procurement plans; and initiating management of the type of the component based on the final procurement plans.

The first portion of the initial procurement plans are not members of the final procurement plans.

Obtaining the initial procurement plan may include identifying an aggregate number of failures of the type of the component indicated by the component failure predictions; and divide the aggregate number of failures by a number of the assessment periods to obtain a procurement rate of the assessment period.

Revising an initial procurement plan of the first portion of the initial procurement plans may include identifying a delta between the procurement rate for the assessment period and the acquisition limit for the assessment period; reducing the procurement rate based on the delta; and increasing a procurement rate of another initial procurement plan of the procurement plans based on the delta.

Updating the revised procurement plans and the second portion of the initial procurement plans may include identifying an average procurement rate of the revised procurement plans and the second portion of the initial procurement plans; and modifying the revised procurement plans and the second portion of the initial procurement plans based on the average procurement rate to reduce a procurement rate variance from the average procurement rate.

Initiating management of the type of the component may include for each assessment period, obtaining a quantity of the type of the component at a point in time for the assessment period, the quantity of the type of the component being based on the procurement rate specified by a final procurement plan of the final procurement plans associated with the assessment period; and replacing at least one component of the data processing systems using at least one of the quantity of the component to maintain operation of the data processing systems.

The acquisition limit may indicate a maximum quantity of the type of the component that may be acquired during the assessment period. Each of the assessment periods may be respective portions of the cycle period, and the acquisition limit for each of the assessment periods is a same limit. The stock level goal for the type of the component is based on a maximum quantity of the component indicated to fail during any of the assessment periods by the component failure predictions.

Initiating management of the type of the component may include providing the final procurement plans to a third party charged with managing the data processing systems.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer implemented services. The system may include deployment 100. Deployment 100 may include any number of data processing systems 102 that provide the computer implemented services. For example, deployment 100 may include one or more data processing systems 102 that may independently and/or cooperatively provide the computer implemented services.

For example, all, or a portion, of data processing systems 102 may provide computer implemented services to users and/or other computing devices operably connected to deployment 100. The computer implemented services may include any type and quantity of services including, for example, database services, instant messaging services, video conferencing services, etc. Different data processing systems may provide similar and/or different computer implemented services.

To provide the computer implemented services, deployment 100 may host applications that provide these (and/or other) computer implemented services. The applications may be hosted by one or more of data processing systems 102.

Any of data processing systems 102, and components thereof, as well as hosted entities (e.g., applications that provide computer implemented services, other applications that manage the operation of deployment 100, etc.), may use hardware components of the data processing systems 102. The hardware components may include, for example, processors, memory modules, data storage devices, network interface components (or other communication devices), and/or any other type of hardware component usable by a data processing system.

Any of the hardware components may fail or may need to be replaced for other reasons. To manage hardware component failures, deployment 100 may include hardware component inventory 104. Hardware component inventory 104 may be a collection of hardware components that may be used to replace hardware components of data processing systems 102. When a hardware component of data processing systems 102 is replaced, a stock level of that hardware component from hardware component inventory 104 may be reduced.

In general, embodiments disclosed herein may provide systems, devices, and methods for managing data processing systems to improve the likelihood of continued operation of data processing systems 102 in view of potential failures. To improve the likelihood of continuing the operation of data processing systems 102, stock levels of hardware components of hardware component inventory 104 may be managed as part of a management framework to ensure that sufficient quantities of hardware components from hardware component inventory 104 are available as hardware components of data processing systems 102 are replaced.

To implement the management framework, the system shown in FIG. 1 may include deployment manager 110. Deployment manager 110 may be tasked with managing deployment 100. Deployment manager 110 may manage deployment 110 by maintaining stock levels of hardware components of hardware component inventory 104 so that future hardware component failures of data processing systems 102 may be timely remediated with replacement hardware components from hardware component inventory 104.

To maintain the stock levels, deployment manager 110 may (i) obtain component failure predictions for the hardware components of data processing systems 102, (ii) obtain constrains on acquisitions of additional hardware components to maintain stock levels of hardware component inventory 104, and (iii) establish procurement plans for hardware components of hardware component inventory based on the component failure predictions and the acquisition constraints (also referred to as acquisition limits). By doing so, data processing systems 102 may be managed through timely replacement of hardware components so that the uptime of data processing systems 102 is not reduced due to insufficient stock levels in hardware component inventory 104.

Figure 2A:
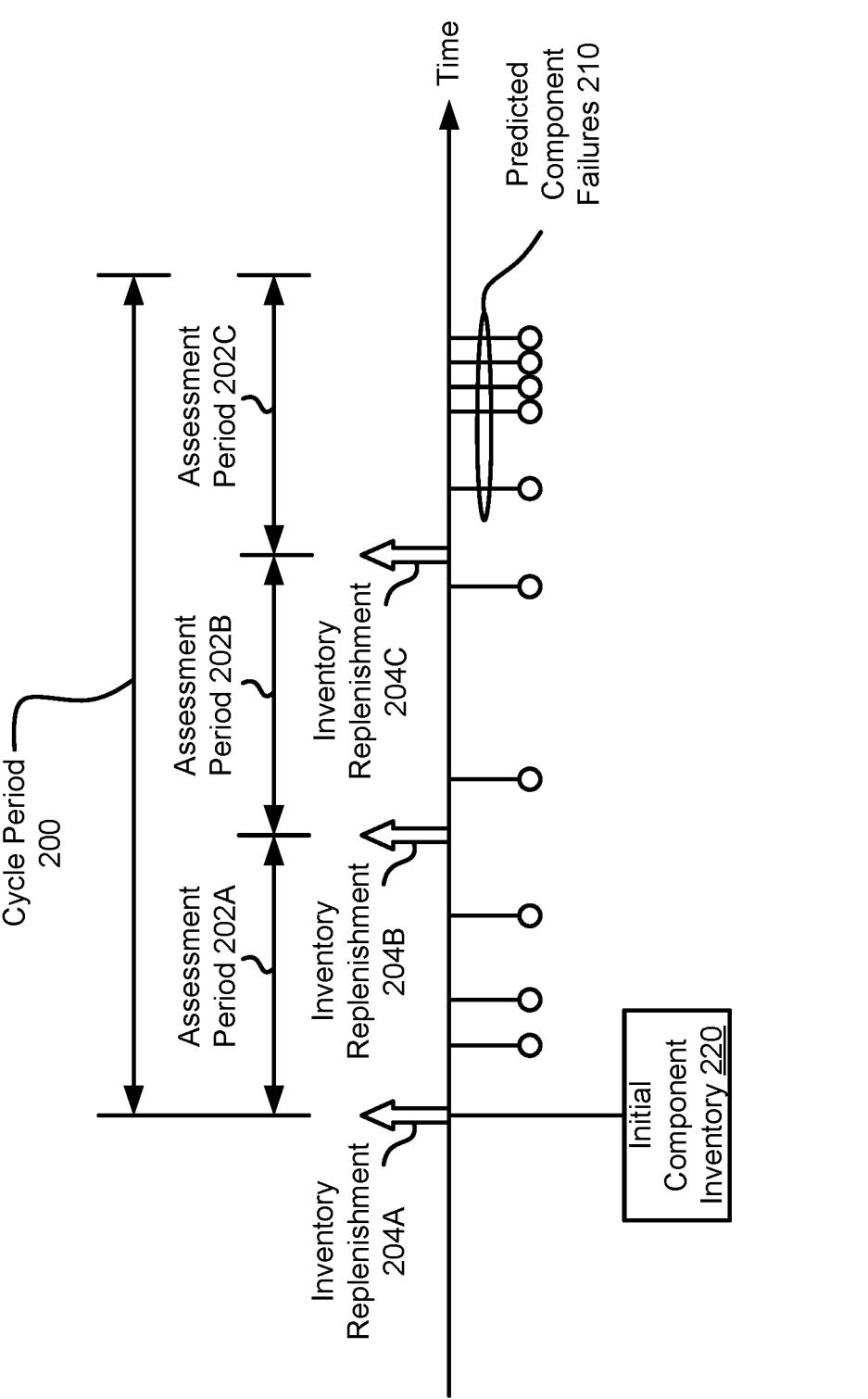
FIG. 2A shows a block diagram illustrating a cycle period in accordance with an embodiment.

The component failure predictions may be obtained via any method. For example, the component failure predictions may be obtained using an inference model (e.g., a trained neural network that predicts future hardware component failures), reading them from storage, and/or receiving them from other devices that may make the predictions. The hardware components failure predictions may include any number and type of hardware component failures for data processing systems 102. Refer to FIG. 2A for additional details regarding hardware component failures.

The constrains on acquisitions of additional hardware components may be based, for example, on (i) budgetary limits with respect to hardware component purchases, (ii) time limits with respect to hardware component purchases, and (iii) goals with respect to hardware component acquisitions. The hardware component acquisition goals may include (i) balancing quantities of acquisitions of a type of hardware component over time (e.g., so that predictable number of hardware components may be acquired at regular time intervals, semi-regular time intervals, or at certain points in time), (ii) meeting the budgetary limits (e.g., which may preferably not be exceeded) and time limits, and/or (iii) stock level goals (e.g., certain quantities of hardware components being available to use in replacements of hardware components of data processing systems 102) for hardware components of hardware component inventory 104.

The procurement plans may be established by (i) identifying expected quantities of a component expected to fail during a cycle (e.g., period of time), (ii) dividing the cycle into assessment periods, (iii) establishing initial procurement plans for each of the assessment periods based on a prorated portion of the expected quantities of hardware components expected to fail during the cycle, and (iv) revising/updating the initial procurement plans based on the constraints on the acquisitions of hardware components to obtain final procurement plans for the assessment periods.

Figure 2B:
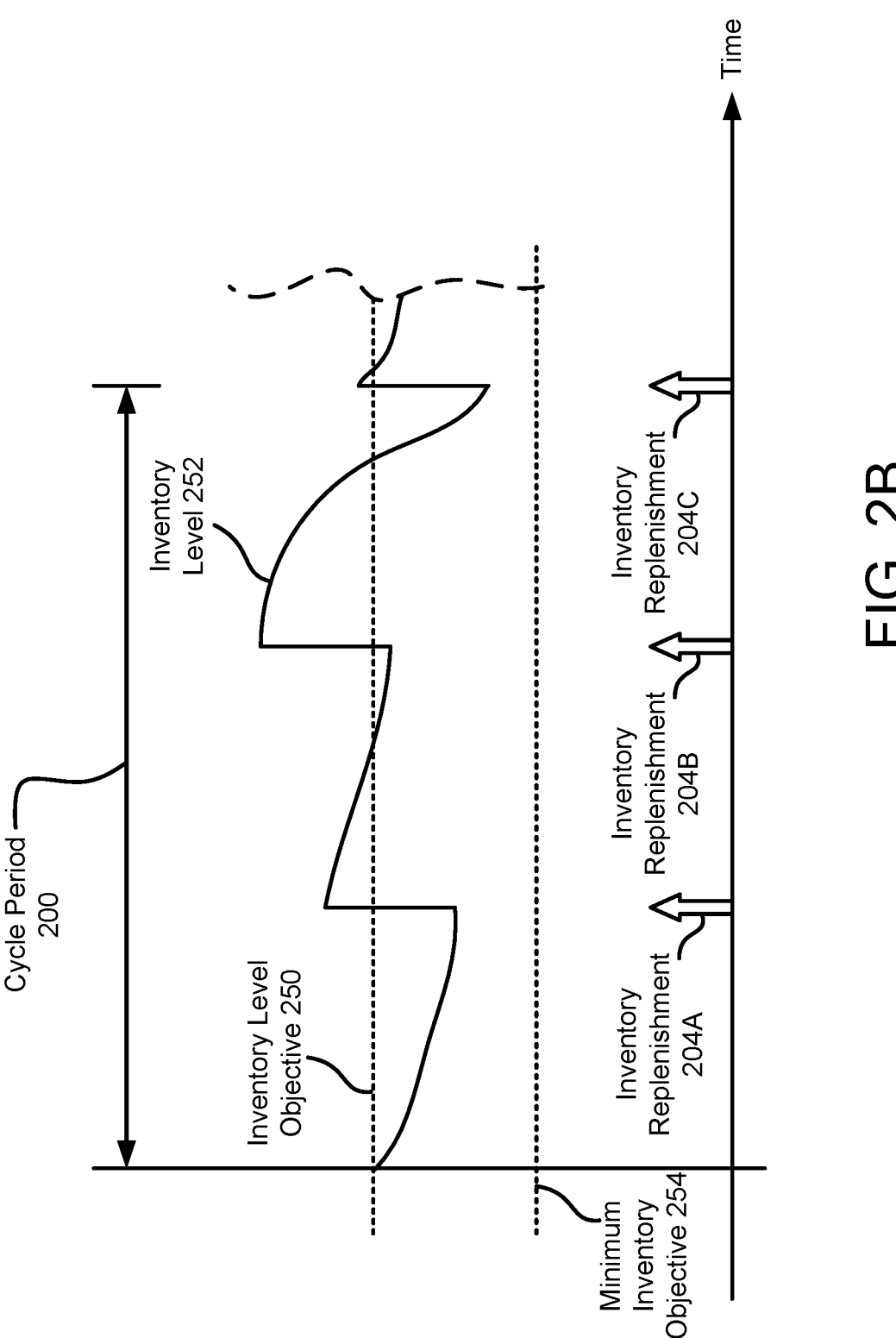
FIG. 2B shows a block diagram illustrating a stock level managed using procurement plans in accordance with an embodiment.

Once the final procurement plans are established, hardware component inventory 104 may be managed based on the final procurement plans. For example, quantities of additional hardware components may be acquired at various points in time in accordance with the final procurement plans. The additional hardware components may be added to hardware component inventory 104 to maintain the stock levels of hardware component inventory 104. Refer to FIG. 2B for additional details regarding maintaining stock levels of hardware component inventory 104.

To manage the stock levels of hardware component inventory 104, deployment manager 110 may automatically initiate ordering and delivery of hardware components to deployment 100 (and/or operators thereof). To initiate the ordering and delivery, deployment manager 110 may (i) place orders with ordering systems or (ii) providing the final procurement plans to operators of deployment 100 (e.g., which may be third parties).

When providing its functionality, deployment manager 110 may perform all, or a portion, of the methods and/or actions shown in FIG. 3.

Data processing systems 102 and/or deployment manager 110 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 4.

Any of the components illustrated in FIG. 1 may be operably connected to each other (and/or components not illustrated) with a communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

Turning to FIG. 2A, a diagram illustrating a period of time during which component of data processing systems may be replaced in accordance with an embodiment is shown. In the figure, time generally proceeds from left to right on the page (e.g., along the arrow marked "Time"). Various portions in time (e.g., 200, 202A, 202B, 202C) are indicated using the lines above the time line.

As discussed above, over time various hardware components of data processing systems may be replaced. To manage the replacement process through proactive stocking of replacement hardware components, predicted component failures 210. Any number of predicted component failures 210 may occur at any point in time. In FIG. 2A, the predicted component failures are illustrated using a limited number of indicators (e.g., three during assessment period 202A). However, it should be understood that any number of predicted component failures may be taken into rather than the limited number shown in FIG. 2A and the pattern of actual predicted component failures may be different from the pattern shown in FIG. 2A.

To manage the component stock levels, a planning process may be performed. The planning process may be performed for cycle period 200 which may be based, for example, on a calendar year or other period of time. Cycle period 200 may be divided into any number of assessment periods (e.g., 202A-202C).

Each of these assessment periods may be associated with one or more inventory replenishments (e.g., 204A, 204B, 204C), which may represent periods of time when hardware components are acquired. Any of inventory replenishments 202A-204C may each be associated with one or more constraints related to budget, time, or other factors. These constraints may be based on limitations/goals imposed by the operator of a deployment. For example, the constrains may include a financial constraint that limits the number of hardware components that may be acquired (or may preferred to be acquired) during the corresponding inventory replenishment (e.g., an acquisition process such as a purchase of hardware components from a vendor). Additionally, at the start of cycle period 200, an initial component inventory 220 may be established.

To identify when and how component hardware components should be obtained during each of the inventory replenishments 204A, 204B, 204C, as discussed above, the system may take into account predicted component failures 210 and constraints associated with the respective inventory replenishments so that the quantity of hardware components acquired during each inventory replenishment may be within the corresponding constraints while also ensuring that sufficient stock levels of the hardware components are maintained.

To do so, corresponding procurement plans may be obtained through a process of initial procurement plan generation and subsequent refinement. Refer to FIG. 3 for additional details regarding how procurement plans may be obtained. Refer to FIG. 2B for details regarding implementation of procurement plans.

Turning to FIG. 2B, a diagram illustrating an inventory level for a hardware component over time as managed based on procurement plans in accordance with an embodiment is shown. In the figure, time generally proceeds from left to right on the page (e.g., along the arrow marked "Time").

To implement procurement plans, inventory replenishments (e.g., 204A, 204B, 204C) during a cycle period may be performed in accordance with corresponding procurement plans. The procurement plans may specify quantities of various hardware components to be obtained during the inventory replenishments. The procurement plans may be obtained using the method illustrated in FIG. 3. The procurement plans may ensure compliance with certain criteria and/or goals, such as, for example, inventory level objective 250 and/or other type of criteria or goals.

In FIG. 2B, inventory level objective 250 may represent a goal inventory level for a hardware component at the beginning and end of a cycle period (e.g., 200). During the cycle period, the quantity of the hardware components maintained in a hardware component inventory may diverge from the goal due to, for example, the discrete inventory replenishments and the variable rate at which hardware components from the inventory may be used for replacement purposes.

For example, as seen in FIG. 2B, at a beginning of cycle period 200, inventory level 252 of a hardware component may meet the objective, but then begin to diverge from inventory level objective 250. When subsequent inventory replenishments occur, the inventory level of the hardware component may increase. Depending on the component failure predictions during various assessment periods, the inventory replenishments may increase the inventory level for the hardware component above inventory level objective 250 with the goal of, for example, balancing the number of acquisitions in each inventory replenishments (e.g., in contrast to a goal of merely brining the inventory level back up to the minimum necessary to meet inventory level objective 250). By doing so, the number of hardware components acquired during each inventory replenishment may be similar to the number acquired during the other inventory replenishments, while also ensuring compliance with inventory level objective 250 at a macro level across cycle period 200.

For example, as seen in FIG. 2B, there may be a relatively small number of component failure predictions until the last third of the cycle period. If inventory level 252 had not been proactively increased during the prior two thirds of cycle period 200, then inventory level 252 may (i) dip below minimum inventory objective 254 if inventory replenishments 204A-204C merely increased the inventory level back to inventory level objective 250 and (ii) require a much larger number of hardware component acquisitions during inventory replenishment 204C than as required for either inventory replenishment 204A or 204B.

Thus, embodiments disclosed herein may provide an improved method for proactive management of a deployment through hardware component replacement acquisition. For example, by providing balance between different inventory replenishments, better pricing terms may be obtained and the inventory level may be maintained in a manner less sensitive to unexpected/unpredicted hardware component failures (e.g., having a smaller number of hardware components in inventory that is less than minimum inventory objective 254 may place the deployment at risk of inoperability should an unexpectedly large number of hardware components need to be replaced).

As discussed above, the components of FIG. 1 may perform various methods to increase the likelihood of data processing systems being able to provide computer implemented services through proactive hardware component management. FIG. 3 shows a diagram of a method that may be performed by the system of FIG. 1. In each of these figures, any of the operations may be performed in different orders, skipped, repeated, and/or be performed in a parallel or partially overlapping in time manner.

Turning to FIG. 3, a flow diagram illustrating a method of managing a deployment in accordance with an embodiment is shown. The method may be performed, for example, by a deployment manager or another component of the system shown in FIG. 1.

At operation 300, a cycle period is identified. The cycle period may be period of time for which procurement plans will be establish to manage a deployment. The cycle period may be obtained by reading it from storage, receiving it as input from a user, or receiving it from another device. The cycle period may be, for example, a calendar year or another period of time.

At operation 302, assessment periods for the cycle period are identified. Acquisition limits for each of the assessment periods may also be identified. The assessment periods and acquisitions limits may be obtained by reading them from storage, receiving them as input from a user, or receiving them from another device.

In an embodiment, the assessment periods are obtained procedurally. For example, the cycle period may be broken down into assessment periods using a formula or other automated procedural tool. Each of the assessment periods may be a portion of the cycle period. The assessment periods may be of similar or different duration.

In an embodiment, the acquisition limits specify limits on inventory replenishments associated with corresponding assessment periods. For example, the acquisition limits may indicate a limit in terms of a budget for inventory replenishment, a limit regarding quantities of types of hardware components that may be acquired during each assessment period, and/or other limits that may need to be taken into account when establishing procurement plans for the inventory replenishments. Goals, in additional to limits, may also be obtained. Any of the acquisition limits may be cast as a goal, which may provide a greater degree of flexibility when establishing the procurement plans. For example, a limit may specify criteria that must be met by the procurement plans, whereas a goal may define an objective that the procurement plan may diverge from if necessary for plan implementation.

At operation 304, for each assessment period, an initial procurement plan is obtained. The initial procurement plan be based on component failure predictions for a type of component (e.g., for which a procurement plan is being developed) during the assessment period. The initial procurement plan may also be based on an initial stock level for the type of component for the assessment period. The initial procurement plan may also be based on acquisition limits for the assessment period (e.g., identified in operation 302).

In an embodiment, the initial procurement plan is obtained by (i) computing a component purchased block by dividing a budget block (e.g., available budget for a inventory replenishment) by a cost for the component, (ii) aggregating the component failure predictions for the cycle period, (iii) computing a cumulative failure rate for the cycle period, (iv) computing predicted inventory levels for the type of the component during each of the assessment periods (e.g., by identify a quantity of the component block purchases needed to meet the predicted inventory levels), and (v) computing a procurement rate for the assessment period by subtracting the available inventory from the aggregate hardware components predicted to fail over the cycle period to obtain a delta, and averaging the delta across the cycle period. The initial procurement plan may then be set based on the computed procurement rate. However, at this point, the procurement rate may exceed goals and/or limits for each of the inventory replenishment.

At operation 306, a portion of the initial procurement plans that would result in a deviation from a stock level goal (or other limits/goals) for the type of the components is revised to obtain revised procurement plans that do not deviate from the stock level goal (or other limits/goals). The portion may be identified by comparing each of the initial procurements plans to the goals/limits (e.g., acquisition limits/goals). All of those that diverge from the limits/goal may be revised, and the changes made during the revisions may be used to revise other initial procurement plans.

For example, consider a scenario in which the stock level goal is to ensure that the cost for each inventory replenishment is less than a predetermined threshold. If the initial procurement plan indicates that a number of hardware components with a cost greater than the predetermined threshold is to be acquired during a corresponding inventory replenishment, then the fraction of the number of hardware components that exceeds the predetermined cost threshold may be treated as a delta. The initial plan may be revised by reducing the number of hardware components to be within the predetermined cost threshold. The reduced number of hardware components may be treated as a delta, and another initial procurement plan may be revised (e.g., by increasing the number of hardware components to be acquired) based on the delta. While this process may cause the other initial procurement plan to violate the stock level goal, this process may be repeated until all of the initial procurement plans meet the stock level goal (or are as close to meeting the stock level goals as can be managed, not all goals can be met).

While a portion of the initial procurement plan may result in the deviation from the stock level goal, another portion may maintain compliance with the stock level goal for the type of the component. Thus, only some of the initial procurement plans may be revised. The initial procurement plans that need not be revised may be referred to as accepted initial procurement plans.

In an embodiment, an initial procurement plan is revised by (i) identifying a delta between the procurement rate for the assessment period as indicated by the initial procurement plan and the acquisition limit for the assessment period, (ii) reducing the procurement rate based on the delta; and (iii) increasing a procurement rate of another initial procurement plan of the procurement plans based on the delta. By doing so, initial procurement plans that violate goals/limits may be revised to ensure improve compliance with the goals/limits.

At operation 308, the revised procurement plans and the accepted initial procurement plans are updated to even procurement rates throughout the cycle period to obtain final procurement plans. For example, each of the procurement plan rates may be compared to one another, and the procurement rates in temporally related assessment periods may be adjusted reciprocally.

For example, for an average procurement rate across the assessment periods may be identified. A delta between the average procurement rate and the procurement rate from the procurement plan for each assessment period may be identified. A jump value (e.g., the delta) may be then be used to increase or decrease the procurement rate for a procurement plan that has a procurement plan that exceeds the average. The procurement rate for another procurement plan that is for an assessment period temporally related to the assessment period for the procurement plan may be increased or decreased reciprocally.

This may result in, for example, the procurement rate of any of the procurement plans failing to meet acquisition goals/limits. Operations 304-306 may be repeated until these goals/limits are met.

The final procurement plans may be based on the modified procurement rates. For example, each final procurement plan may specify quantities of each hardware component to be acquired during a corresponding inventory replenishment.

At operation 310, management of the type of the components based on the final procurement plans is initiated. The management may be initiated, for example, through automated purchasing of hardware components based on the final procurement plans, by providing the final procurement plans to a party or entity tasked with managing the deployment, or via other means.

The method may end following operation 310.

Thus, as illustrated above, embodiments disclosed herein may provide systems and methods usable to proactively manage data processing systems of deployments proactively. By proactively managing supplies of replacement components, the data processing systems may have improved uptime and other benefits through improved likelihood of having replacement hardware components on hand for replacement. The improved availability of replacement hardware components may as also reduce cost for maintaining part inventory levels by ensuring that when replacement hardware components are obtained, they are done so in large enough numbers to provide purchasing benefits.

Additionally, the disclosed embodiments may be broadly applicable to a range of different scenarios. For example, events such as a hardware refresh, consolidations of resources, redeployment of resources, and/or other events that may indicate significant changes in the need for hardware components for replacement may be addressed.

To do so, the method of FIG. 3 may be supplemented with additional operations including (i) establishing a reserve or additional inventory level requirement or goal based on the type of event (e.g., different events may have corresponding expected numbers of additional replacements from those indicated by the component failure predictions), (ii) identifying a duration for the event, and (iii) increasing the expected number of hardware replacements during these assessment periods correspondingly. To do so, the procurement rate for the initial procurement plan for the assessment period may be correspondingly increased (e.g., procurement rate+increased rate due to the event or a normalized rate for the event divided by the expected duration of the event). The initial procurement plans may then be revised and/or updated, as described with respect to FIG. 3.

Figure 4:
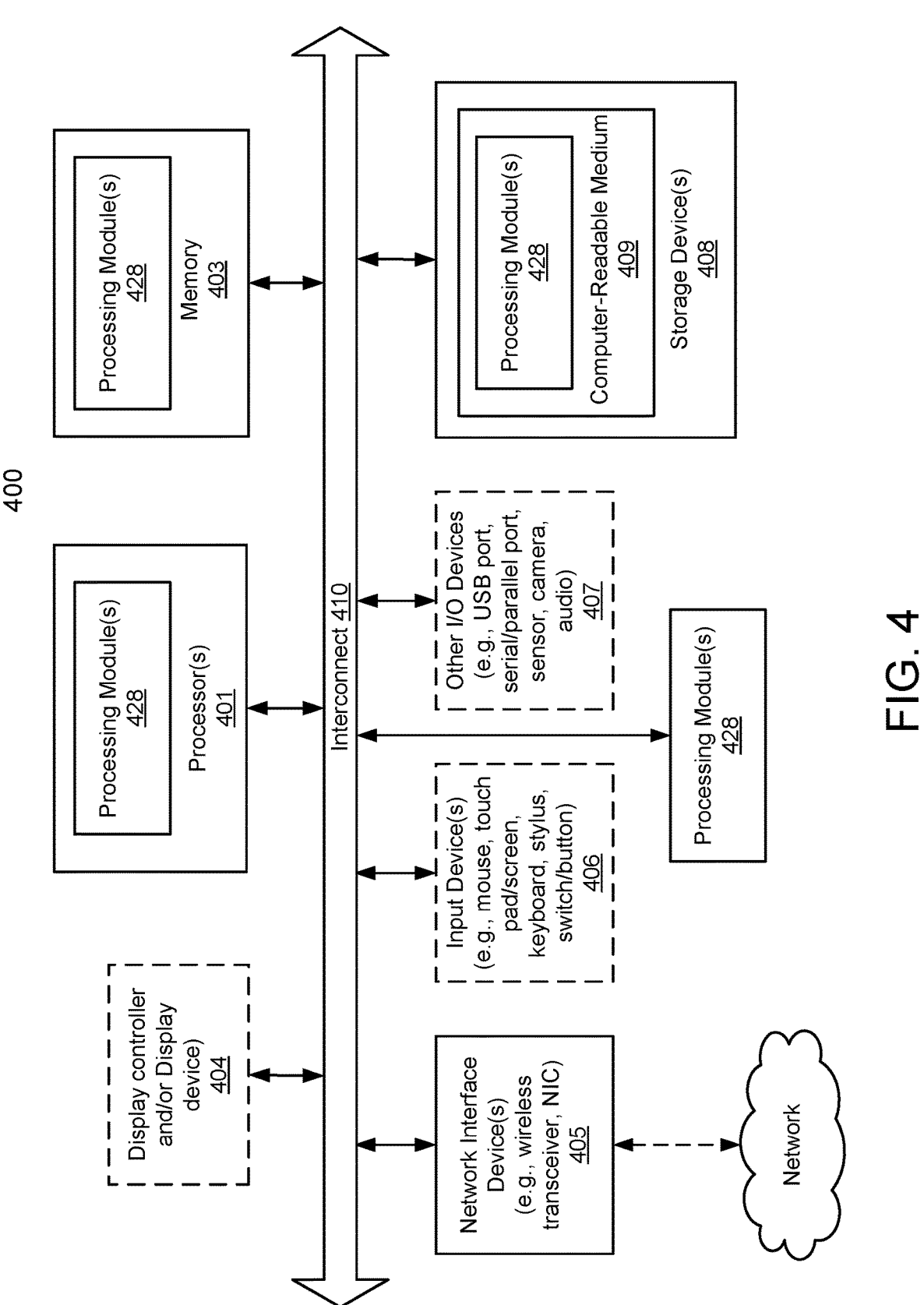
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional 10 device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/ logic 428 can be implemented in any combination hardware devices and software components.

Note that while system 400 is illustrated with various components of a data processing system, it is not intended to represent any particular architecture or manner of inter-connecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic repre-sentations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requir-ing physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic com-puting device, that manipulates and transforms data repre-sented as physical (electronic) quantities within the com-puter system's registers and memories into other data similarly represented as physical quantities within the com-puter system memories or registers or other such informa-tion storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the opera-tions described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing data processing systems using component failure predictions, the method being performed by a computing device configured as a deployment manager and comprising: identifying a cycle period for managing the data processing systems; identifying assessment periods for the cycle period, and acquisition limits for each of the assessment periods, wherein each of the assessment periods starts and ends when a hardware component inventory is replenished during occurrence of one inventory replenishment of one or more inventory replenishments, and a timing of each of the one or more inventory replenishments is pre-set within a predeter-mined cycle period for managing the data processing sys-tems; for each of the assessment periods, generating an initial procurement plan based on: a portion of the compo-nent failure predictions associated with a type of a compo-nent for the assessment period, an initial component stock level for the type of the component within the hardware component inventory at the start of the assessment period, and an acquisition limit associated with the type of the component for the assessment period, the acquisition limit being one of the acquisition limits; identifying a first portion of the initial procurement plans that would result in a deviation from a stock level goal for the type of the component and a second portion of the initial procurement plans that would maintain compliance with the stock level goal for the type of the component; generating revised procurement plans that would maintain compliance with the stock level goal for the type of the component by revising the first portion of the initial procurement plans; generating final procurement plans by updating the revised procurement plans and the second portion of the initial procurement plans to even procurement rates throughout the cycle period, the final procurement plans comprise a timing of an inventory replenishment of the one or more inventory replenishments that is set to occur before at least one currently installed one of the type of the component within the data processing systems will actually fail as specified in the portion of the component failure predictions; and initiating management of the type of the component using the final procurement plans by at least: causing, using the timing in the final procurement plans, automated physical acquisition of the type of the component during the inventory replenishment that is set to occur before the at least one currently installed one of the type of the component within the data processing systems will actually fail te to obtain a replacement for the at least one currently installed one of the type of the component, the replacement being physically installed within the data processing systems to replace the at least one currently installed one of the type of the component before the at least one currently installed one of the type of the component actually fails.

2. The computer-implemented method of claim 1, wherein the first portion of the initial procurement plans are not members of the final procurement plans.

3. The computer-implemented method of claim 1, wherein generating the initial procurement plan comprises: identifying an aggregate number of failures of the type of the component indicated by the component failure predictions; and divide the aggregate number of failures by a number of the assessment periods to obtain a procurement rate of the assessment period.

4. The computer-implemented method of claim 3, wherein generating the revised procurement plans by revising the first portion of the initial procurement plans further comprises: identifying a delta between the procurement rate for the assessment period and the acquisition limit for the assessment period; reducing the procurement rate based on the delta; and increasing a procurement rate of another initial procurement plan of the procurement plans based on the delta.

5. The computer-implemented method of claim 1, wherein generating the final procurement plans by updating the revised procurement plans and the second portion of the initial procurement plans comprises: identifying an average procurement rate of the revised procurement plans and the second portion of the initial procurement plans; and modifying the revised procurement plans and the second portion of the initial procurement plans based on the average procurement rate to reduce a procurement rate variance from the average procurement rate.

6. The computer-implemented method of claim 5, wherein initiating management of the type of the component comprises: for each assessment period, obtaining a quantity of the type of the component at a point in time for the assessment period, the quantity of the type of the component being based on the procurement rate specified by a final procurement plan of the final procurement plans associated with the assessment period; and replacing at least one component of the data processing systems using at least one of the quantity of the component to maintain operation of the data processing systems.

7. The computer-implemented method of claim 1, wherein the acquisition limit indicates a maximum quantity of the type of the component that may be acquired during the assessment period.

8. The computer-implemented method of claim 7, wherein each of the assessment periods are respective portions of the cycle period, and the acquisition limit for each of the assessment periods is a same limit.

9. The computer-implemented method of claim 8, wherein the stock level goal for the type of the component is based on a maximum quantity of the component indicated to fail during any of the assessment periods by the component failure predictions.

10. A non-transitory machine-readable medium having instructions stored therein, which when executed by a processor of a computing device, cause the processor to perform operations for managing data processing systems using component failure predictions, the computing device being configured as a deployment manager and the operations comprising:

identifying a cycle period for managing the data processing systems;

identifying assessment periods for the cycle period, and acquisition limits for each of the assessment periods, wherein each of the assessment periods starts and ends when a hardware component inventory is replenished during occurrence of one inventory replenishment of one or more inventory replenishments, and a timing of each of the one or more inventory replenishments is pre-set within a predetermined cycle period for managing the data processing systems;

for each of the assessment periods, generating an initial procurement plan based on:

a portion of the component failure predictions associated with a type of a component for the assessment period, an initial component stock level for the type of the component within the hardware component inventory at the start of the assessment period, and an acquisition limit associated with the type of the component for the assessment period, the acquisition limit being one of the acquisition limits;

identifying a first portion of the initial procurement plans that would result in a deviation from a stock level goal for the type of the component and a second portion of the initial procurement plans that would maintain compliance with the stock level goal for the type of the component;

generating revised procurement plans that would maintain compliance with the stock level goal for the type of the component by revising the first portion of the initial procurement plans;

generating final procurement plans by updating the revised procurement plans and the second portion of the initial procurement plans to even procurement rates throughout the cycle period, the final procurement plans comprise a timing of an inventory replenishment of the one or more inventory replenishments that is set to occur before at least one currently installed one of the type of the component within the data processing systems will actually fail as specified in the portion of the component failure predictions; and initiating management of the type of the component using the final procurement plans by at least:

causing, using the timing in the final procurement plans, automated physical acquisition of the type of the component during the inventory replenishment that is set to occur before the at least one currently installed one of the type of the component within the data processing systems will actually fail to obtain a replacement for the at least one currently installed one of the type of the component, the replacement being physically installed within the data processing systems to replace the at least one currently installed one of the type of the component before the at least one currently installed one of the type of the component actually fails.

11. The non-transitory machine-readable medium of claim 10, wherein the first portion of the initial procurement plans are not members of the final procurement plans.

12. The non-transitory machine-readable medium of claim 10, wherein generating the initial procurement plan comprises:

identifying an aggregate number of failures of the type of the component indicated by the component failure predictions; and divide the aggregate number of failures by a number of the assessment periods to obtain a procurement rate of the assessment period.

13. The non-transitory machine-readable medium of claim 12, wherein generating the revised procurement plans by revising the first portion of the initial procurement plans further comprises:

identifying a delta between the procurement rate for the assessment period and the acquisition limit for the assessment period;

reducing the procurement rate based on the delta; and increasing a procurement rate of another initial procurement plan of the procurement plans based on the delta.

14. A data processing system configured as a deployment manager, comprising:

a memory; and a processor coupled to the memory, wherein the processor is programmed to perform operations for managing data processing systems using component failure predictions and the operations comprise:

identifying a cycle period for managing the data processing systems;

identifying assessment periods for the cycle period, and acquisition limits for each of the assessment periods, wherein each of the assessment periods starts and ends when a hardware component inventory is replenished during occurrence of one inventory replenishment of one or more inventory replenishments, and a timing of each of the one or more inventory replenishments is pre-set within a predetermined cycle period for managing the data processing systems;

for each of the assessment periods, generating an initial procurement plan based on:

a portion of the component failure predictions associated with a type of a component for the assessment period, an initial component stock level for the type of the component within the hardware component inventory at the start of the assessment period, and an acquisition limit associated with the type of the component for the assessment period, the acquisition limit being one of the acquisition limits;

identifying a first portion of the initial procurement plans that would result in a deviation from a stock level goal for the type of the component and a second portion of the initial procurement plans that would maintain compliance with the stock level goal for the type of the component;

generating revised procurement plans that would maintain compliance with the stock level goal for the type of the component by revising the first portion of the initial procurement plans;

generating final procurement plans by updating the revised procurement plans and the second portion of the initial procurement plans to even procurement rates throughout the cycle period, the final procurement plans comprise a timing of an inventory replenishment of the one or more inventory replenishments that is set to occur before at least one currently installed one of the type of the component within the data processing systems will actually fail as specified in the portion of the component failure predictions; and initiating management of the type of the component using the final procurement plans by at least:

causing, using the timing in the final procurement plans, automated physical acquisition of the type of the component during the inventory replenishment that is set to occur before the at least one currently installed one of the type of the component within the data processing systems will actually fail to obtain a replacement for the at least one currently installed one of the type of the component, the replacement being physically installed within the data processing systems to replace the at least one currently installed one of the type of the component before the at least one currently installed one of the type of the component actually fails.

15. The data processing system of claim 14, the first portion of the initial procurement plans are not members of the final procurement plans.

16. The data processing system of claim 14, wherein generating the initial procurement plan comprises:

identifying an aggregate number of failures of the type of the component indicated by the component failure predictions; and divide the aggregate number of failures by a number of the assessment periods to obtain a procurement rate of the assessment period.

17. The computer-implemented method of claim 1, wherein each of the initial procurement plans, the revised procurement plans, and the final procurement plans comprises a timing of at least one inventory-replenishment of the inventory replenishments.

18. The computer-implemented method of claim 17, wherein the final procurement plans generated during a first assessment period of the assessment periods comprise at least a timing for a first inventory-replenishment of the one or more inventory replenishments, a component specified in the final) procurement plans being replenished during the first inventory replenishment, and a start of the first inventory replenishment triggers a start of a second assessment period of the assessment periods.

19. The computer-implemented method of claim 18, wherein the inventory replenishment that is set to occur before the at least one currently installed one of the type of the component within the data processing; systems will actually fail is selected for inclusion into the final procurement plans based at east on a first inventory replenishment among the one or more inventory replenishment during which the replacement can be obtained while maintaining compliance with one or more goals set for the first inventory replenishment, the one or more goals comprising the stock level goal for the type of the component.

20. The computer-implemented method of claim 17, wherein the inventory replenishment that is set to occur before the at least one currently installed one of the type of the component within the data processing systems will actually fail is selected for inclusion into the final procurement plans based at east on a first inventory replenishment among the one or more inventory replenishment during which the replacement can be obtained while maintaining compliance with one or more goals set for the first inventory replenishment, the one or more goals comprising the stock level goal for the type of the component.

* * * * *